(12) United States Patent
Schröder et al.

(10) Patent No.: US 11,221,006 B2
(45) Date of Patent: Jan. 11, 2022

(54) DEVICE FOR WETTING A PLURALITY OF THREADS, AND METERING PUMP FOR SUCH A DEVICE

(71) Applicant: Oerlikon Textile GmbH & Co. KG., Remscheid (DE)

(72) Inventors: Michael Schröder, Remscheid (DE); Heike Jungbluth, Rommerskirchen (DE); Dietrich Witzler, Rommerskirchen (DE)

(73) Assignee: Oedikon Textile GmbH & Co. KG, Remscheid (DE)

( * ) Notice: Subject to any disclaimer, the term of this patent is extended or adjusted under 35 U.S.C. 154(b) by 230 days.

(21) Appl. No.: 16/476,643

(22) PCT Filed: Jan. 3, 2018

(86) PCT No.: PCT/EP2018/050126
§ 371 (c)(1),
(2) Date: Jul. 9, 2019

(87) PCT Pub. No.: WO2018/130445
PCT Pub. Date: Jul. 19, 2018

(65) Prior Publication Data
US 2019/0331111 A1  Oct. 31, 2019

(30) Foreign Application Priority Data

Jan. 12, 2017  (DE) .......................... 102017000243.6
Jan. 27, 2017  (DE) ............................ 10207000760.8

(51) Int. Cl.
*D01D 5/096* (2006.01)
*F04C 2/08* (2006.01)
(Continued)

(52) U.S. Cl.
CPC ............. *F04C 2/084* (2013.01); *D01D 5/096* (2013.01); *D06B 3/045* (2013.01); *D06B 5/06* (2013.01);
(Continued)

(58) Field of Classification Search
None
See application file for complete search history.

(56) References Cited

U.S. PATENT DOCUMENTS 1,607,484 A * 11/1926 Schlumpf ................ D06B 5/00
68/184

FOREIGN PATENT DOCUMENTS

| DE | 102014000304 | 7/2014 |
| EP | 1039011 | 9/2000 |
| WO | 2013110633 | 8/2013 |

OTHER PUBLICATIONS

WIPO translation WO 2013/110633, Device for Wetting Multiple Filaments, Schroter (Year: 2013).*

* cited by examiner

*Primary Examiner* — Cristi J Tate-Sims
(74) *Attorney, Agent, or Firm* — BainwoodHuang

(57) ABSTRACT

Particular techniques involve a device for wetting multiple threads with a fluid, and a dosing pump which is connected to the wetting means by multiple conveying lines. The dosing pump has multiple conveying means for generating multiple dosing flows of the fluid and has multiple pump outlets, to which the delivery lines are connected. The conveying means are formed by at least one planetary gear set arranged between housing plates. To achieve, as far as possible, a uniform throughflow without a significant dead space volume, multiple planet gears of the planetary gear set are guided freely by a centering plate between adjacent housing plates. The planet gears of the planetary gear set (Continued)

Figure 1:
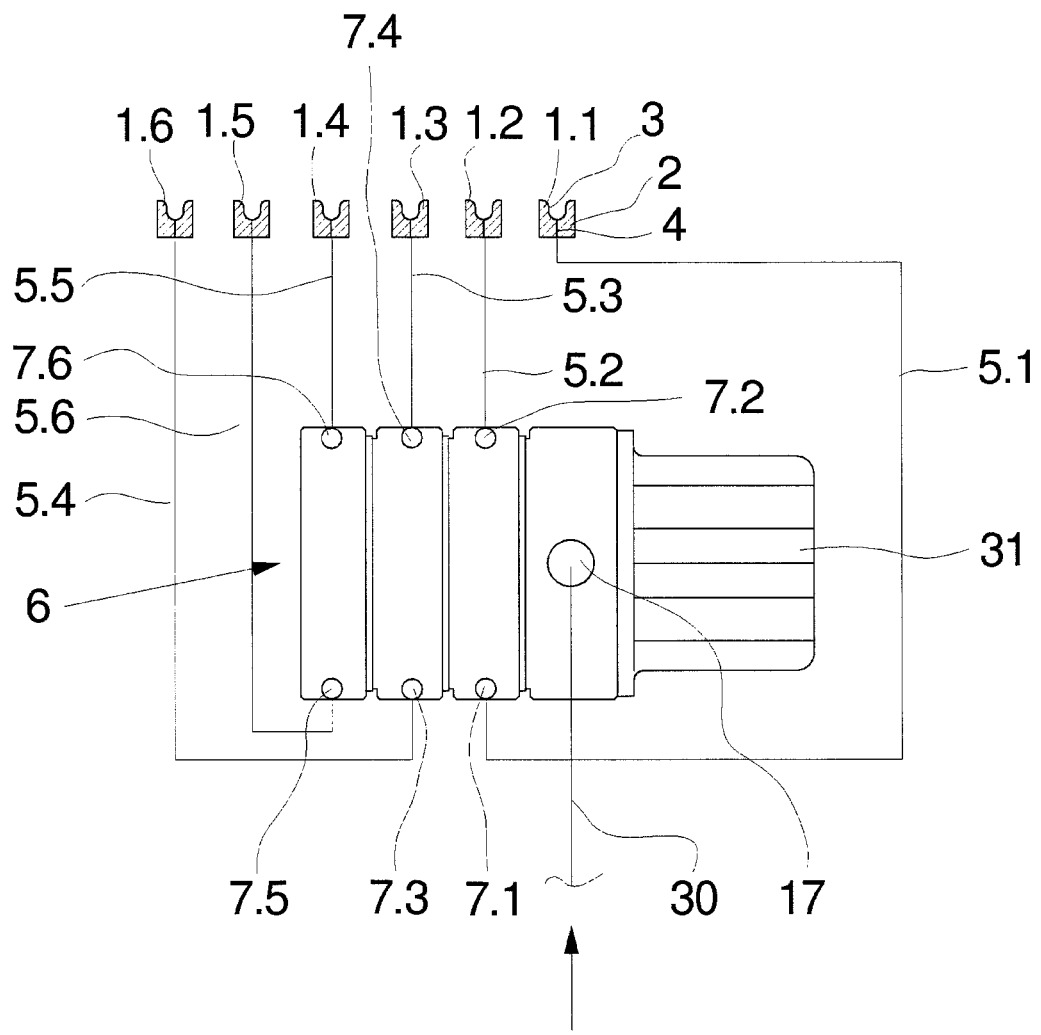

have in each case one passage opening, which are connected by a channel system to a central pump inlet. It is thus possible to realize close fits and flushing of gaps.

14 Claims, 8 Drawing Sheets

(51) Int. Cl.
    *D06B 3/04*         (2006.01)
    *D06B 5/06*         (2006.01)
    *F04C 13/00*       (2006.01)
    *F16H 1/28*         (2006.01)
    *F04C 15/00*       (2006.01)

(52) U.S. Cl.
    CPC ............... *F04C 13/00* (2013.01); *F16H 1/28* (2013.01); *F04C 15/008* (2013.01); *F04C 2240/70* (2013.01)

DEVICE FOR WETTING A PLURALITY OF THREADS, AND METERING PUMP FOR SUCH A DEVICE

The invention relates to a device for wetting multiple threads, as disclosed herein, and to a dosing pump, in particular for use in a device for wetting threads.

In the production and processing of synthetic threads, it is generally known for the threads to be wetted with a fluid. For example, during the production of synthetic threads, after the melt spinning, the fluid is utilized to ensure the cohesion of the filaments of the thread. By contrast, in a texturing process for the aftertreatment of the synthetic threads, the fluid is utilized for cooling a previously warmed thread. Irrespective of whether the fluid serves for the preparation or for the cooling of the threads, it is necessary for the fluid to be fed to the running threads in continuous fashion with high dosing accuracy. Furthermore, during the melt spinning and also during the texturing, groups of threads are guided and treated in parallel adjacent to one another, such that the fluid must be fed in equal dosing quantities in parallel at multiple wetting means.

A generic device for wetting multiple threads and a generic dosing pump are known for example from EP 1 039 011 A2.

In the case of the known device, the dosing flows of a fluid are generated by multiple conveying means of a dosing pump. The conveying means are formed by toothed gear pairings of a planetary gear set, wherein multiple planetary gear sets are held between housing plates. Here, each planetary gear set is formed from a sun gear and multiple planet gears, wherein the sun gear is arranged on a drive shaft, and wherein the planet gears are guided by axles mounted rotatably in the housing plates. Formed on the housing plates are the pump outlets, which are connected in each case to the outlet zones of the planetary gear sets. Each of the pump outlets is assigned a wetting means, which are connected by means of separate conveying lines to the dosing pump.

With the known device, it is thus possible for a multiplicity of threads to be wetted in parallel with a fluid. Both for the preparation of threads and for the cooling of threads, fluids composed of an oil-water emulsion are used. Such emulsions however have the disadvantage of a limited lifetime. For example, in the case of relatively long lifetimes, bacteria can form in the fluid, which leads to outgassing and thus to bubble formation.

In the case of the known device for wetting multiple threads, it has now been observed that even the fluid residues held in dead spaces of the dosing pump can give rise to such outgassing.

It is therefore an object of the invention to further develop the generic device for wetting multiple threads, and a generic dosing pump, such that the most uniform possible wetting can be performed in parallel on a multiplicity of threads with low dosing flows of the fluid.

Said object is achieved according to the invention by means of a device for wetting multiple threads having the features disclosed herein and by means of a dosing pump having the features disclosed herein.

Advantageous refinements of the invention are defined by the features and feature combinations disclosed herein.

The invention is based on the realization that a dead volume in a gearwheel pairing is influenced significantly by a tip clearance that arises between the toothed gears and a housing wall. In order to minimize such clearances in a planetary gear set, the planetary gear sets are, according to the invention, each guided freely by a centering plate between adjacent housing plates. The invention thus intentionally dispenses with journal guidance of the planet gears, which furthermore constitute additional dead spaces at the housing plates. On the contrary, the invention utilizes a passage opening formed in the planet gears to feed the fluid to the respective toothed gear pairing. Constant flushing around the planet gears is thus realized, which prevents a deposition of fluid in the axial gaps of the planetary gear set. The device according to the invention is thus particularly suitable for feeding oil-containing fluid emulsions for wetting multiple threads in dosed fashion to the individual threads. It is thus advantageously possible for extremely low dosing flow rates in the range from 0.05 ml/min to 5 ml/min to be realized for wetting a thread.

To wet a multiplicity of threads uniformly with a dosed fluid flow, the fluid is fed in the same way to the toothed gear pairings at the planetary gear set. For this purpose, the refinement of the invention is particularly preferred in which the channel system has multiple housing bores in the housing plates, which housing bores open into the passage openings of the planet gears of the planetary gear set.

It is preferable for multiple planetary gear sets to be utilized adjacent to one another in parallel in order to simultaneously wet a large number of threads. For this purpose, the housing bores have multiple inlet bores in one of the housing plates and multiple axial distribution bores in the housing plates arranged between adjacent planetary gear sets. It is thus possible for the fluid to be fed in an axial direction to each of the planetary gear sets directly through the passage openings of the planet gears.

The filling of the run-in zones of the planetary gear sets is advantageously ensured by means of multiple distribution grooves which, in one advantageous refinement of the invention, are formed on a side of the housing plates facing toward the planet gear. Here, the distribution grooves extend in each case between one of the passage openings of the planet gears and one of several run-in zones of the planetary gear sets.

In order that even low dosing flow rates of the fluid can be fed to the threads in continuous fashion, the refinement of the invention is particularly preferred in which the planetary gear sets are connected to a drive shaft and in which the drive shaft is coupled to a stepper motor. It is thus possible for even low rotational speeds to be set with high precision and uniformity.

A particularly compact unit can be formed by virtue of the stepper motor being held with a housing on the outer housing plate of the dosing pump and on which the drive shaft is connected directly to a rotor of the stepper motor. The drive shaft of the planetary gear sets thus acts directly as motor shaft of the stepper motor.

Since such devices for wetting multiple threads are preferably utilized for a relatively large number of threads in the range from 12 to 32 threads and thus a total of 12 to 32 conveying lines must be connected to the corresponding number of pump outlets, the refinement of the invention is particularly advantageous in which the pump outlets, assigned to one of the planetary gear sets, in one of the housing plates are formed in each case as a plug-in connector. It is thus possible, for example, for hose lines to be held directly on the pump outlets by means of a simple plug-type connection. Cumbersome threaded fasteners, which require a high level of installation effort, can thus be omitted.

The dosing pump according to the invention is thus particularly suitable for generating a relatively large multiplicity of uniformly generated dosing flows of the fluid. The planetary gear sets are in this case preferably designed with multiple planet gears in order to realize a high density of the pump outlets per housing plate. The number of planet gears per planetary gear set lies in the range from 2 to 6 planet gears.

The invention will be discussed in more detail below on the basis of an exemplary embodiment of the device according to the invention and of the dosing pump according to the invention with reference to the appended figures.

Figure 2:
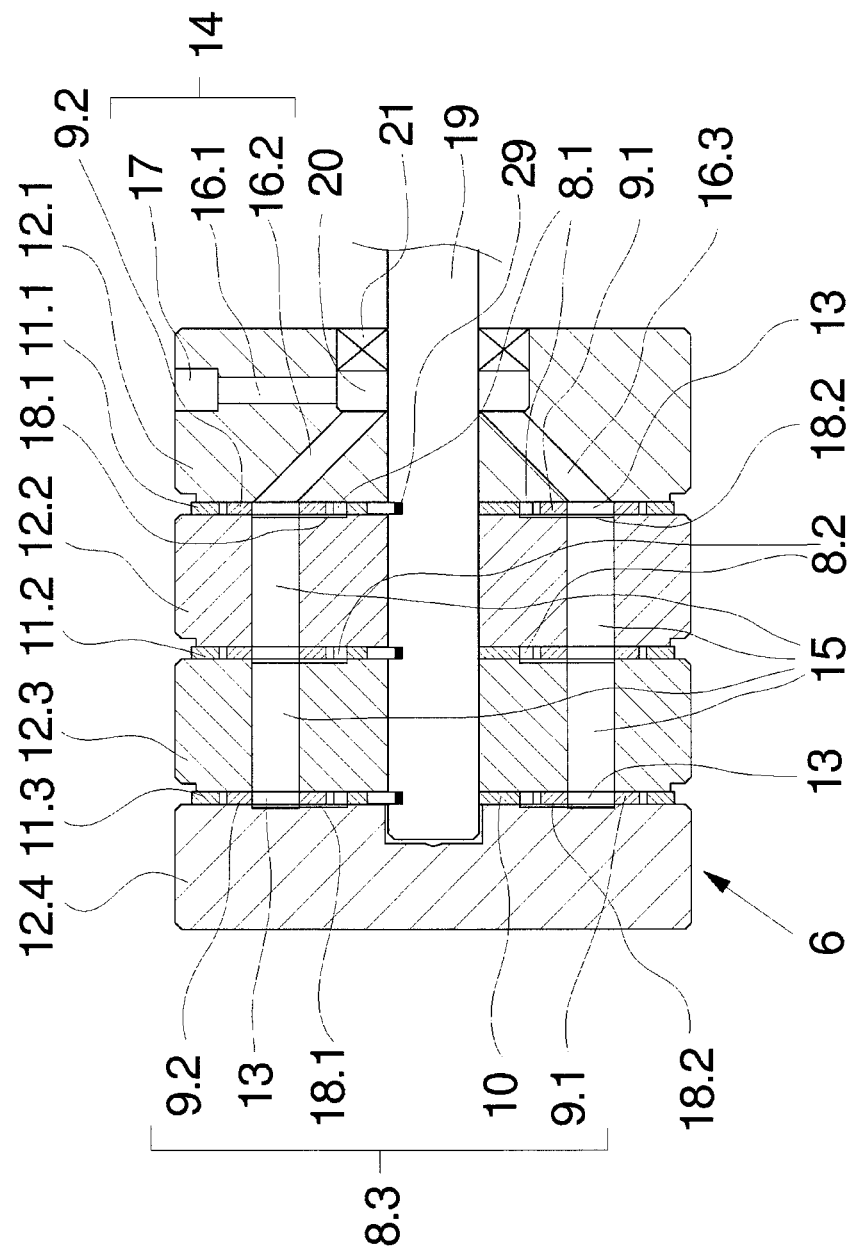

In the figures:

FIG. 1 schematically shows a view of an exemplary embodiment of the device according to the invention for wetting multiple threads FIG. 2 schematically shows a longitudinal sectional view of the dosing pump according to the invention of the exemplary embodiment from FIG. 1

Figure 3:
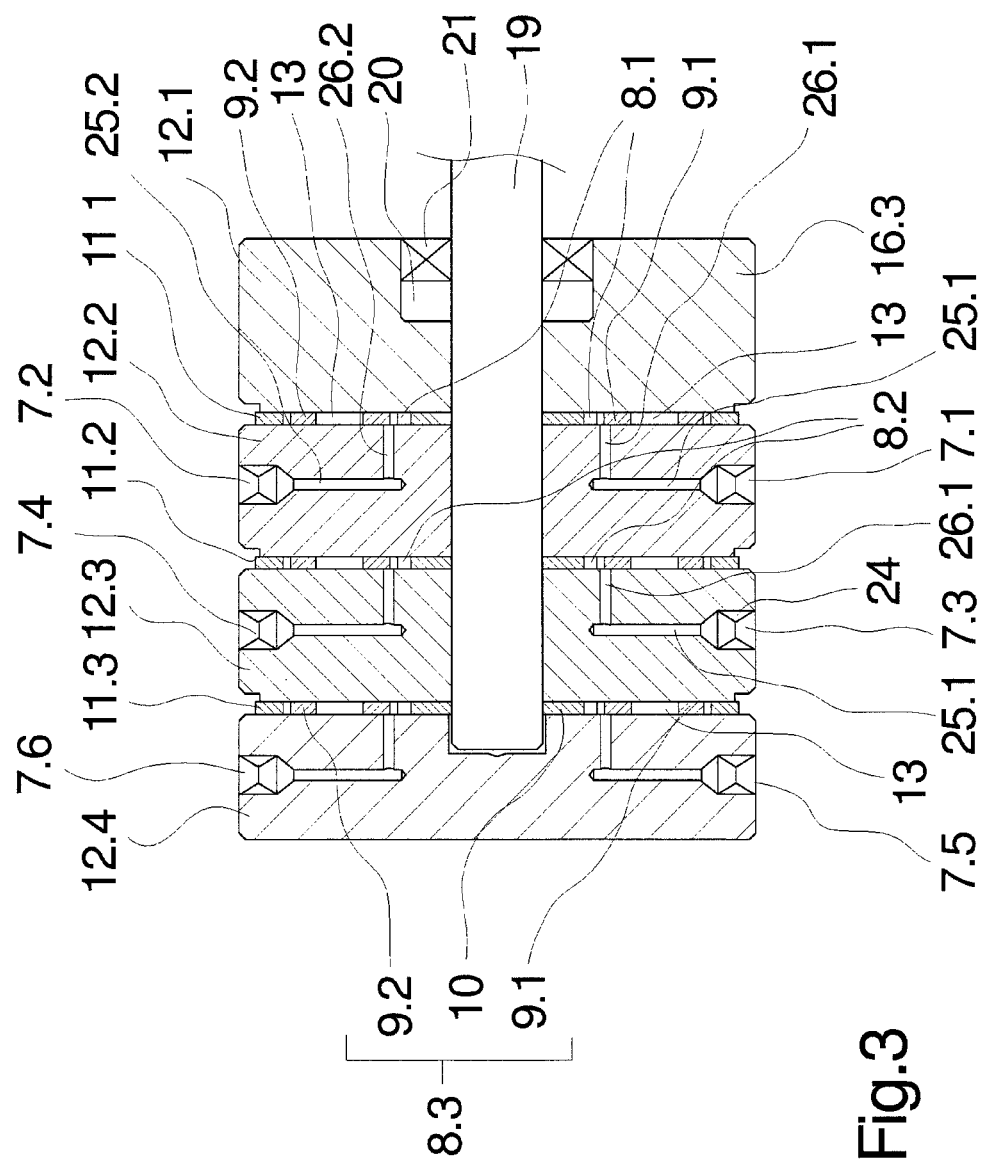

FIG. 3 schematically shows a further longitudinal sectional view of the dosing pump according to the invention of the exemplary embodiment from FIG. 1

Figure 4:
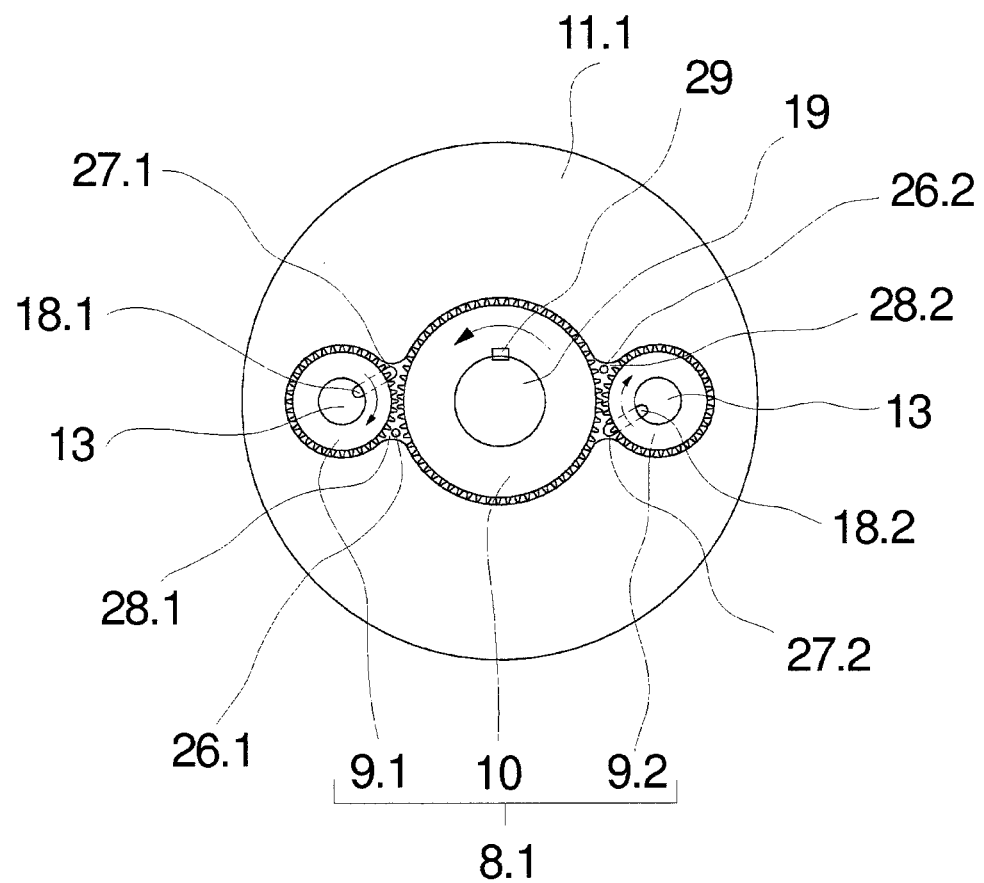

FIG. 4 schematically shows a cross-sectional view of the dosing pump according to the invention of the exemplary embodiment from FIG. 1

Figure 5:
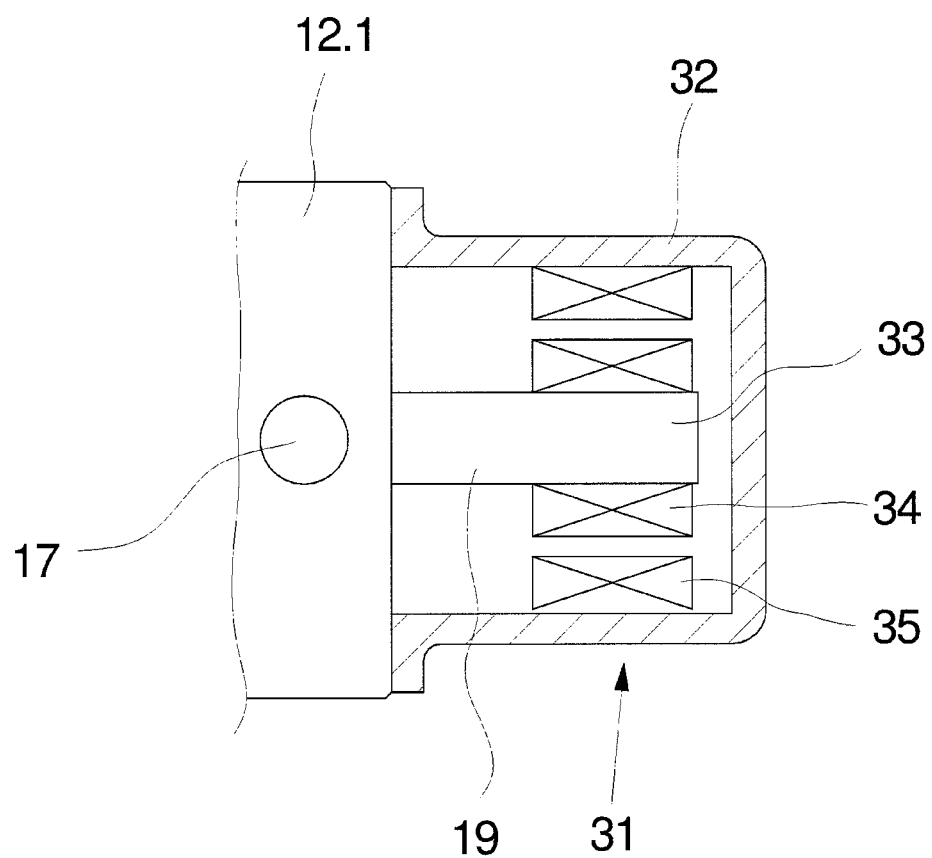
Figure 6:
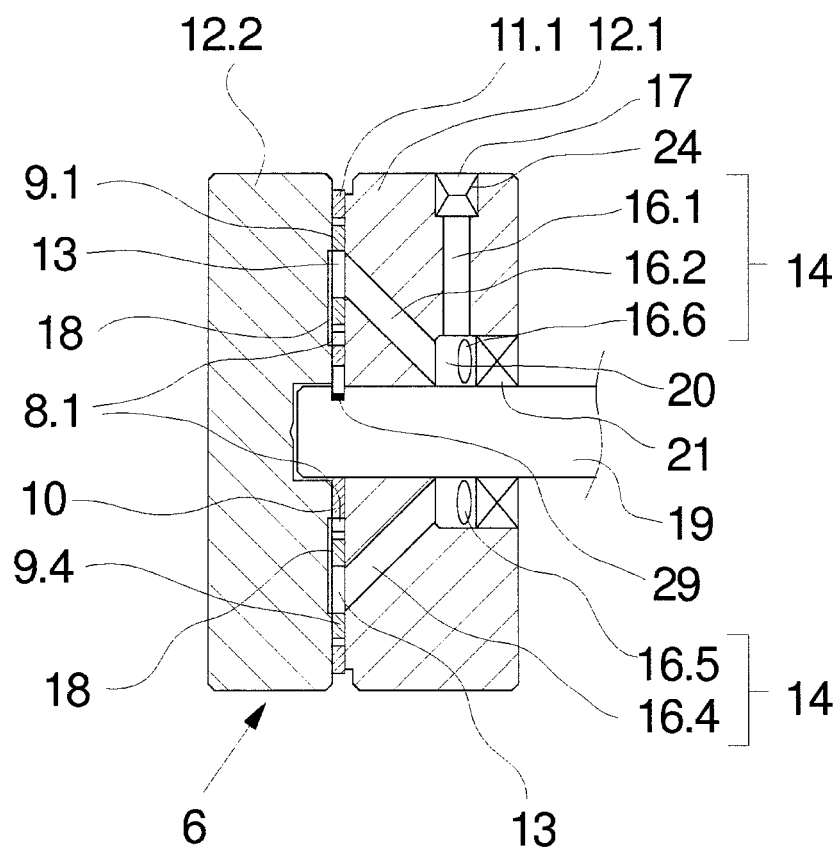
Figure 7:
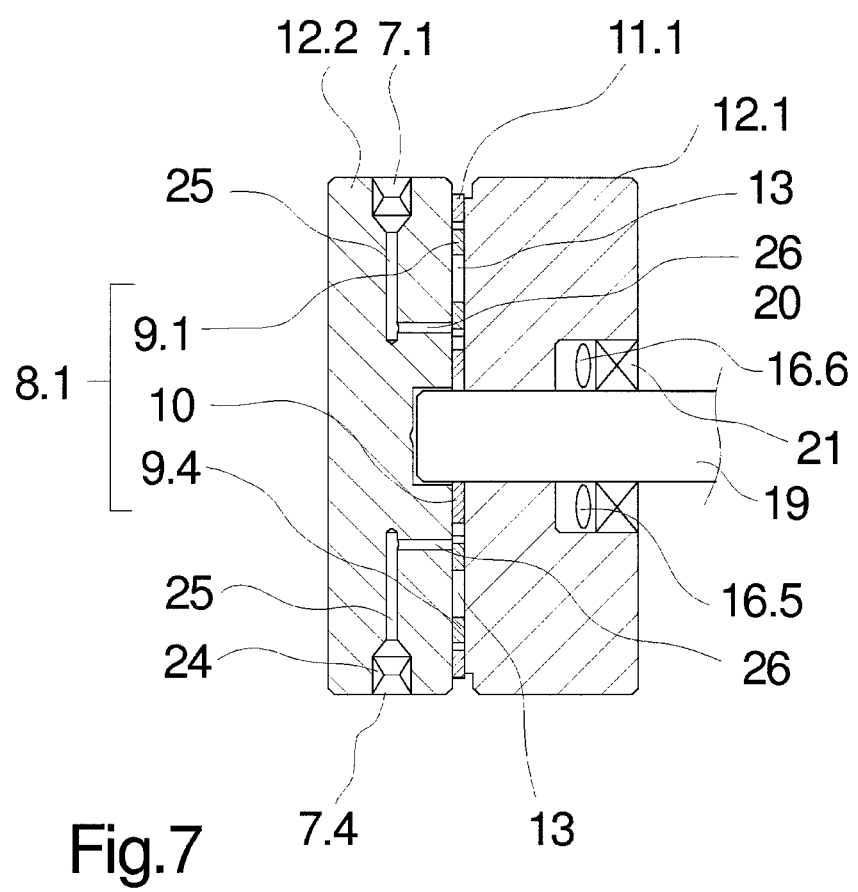

FIG. 5 schematically shows a cross-sectional view of a stepper motor for driving a dosing pump according to the invention FIG. 6 schematically shows a longitudinal sectional view of a further exemplary embodiment of the dosing pump according to the invention FIG. 7 schematically shows a further longitudinal sectional view of the exemplary embodiment from FIG. 6

Figure 8:
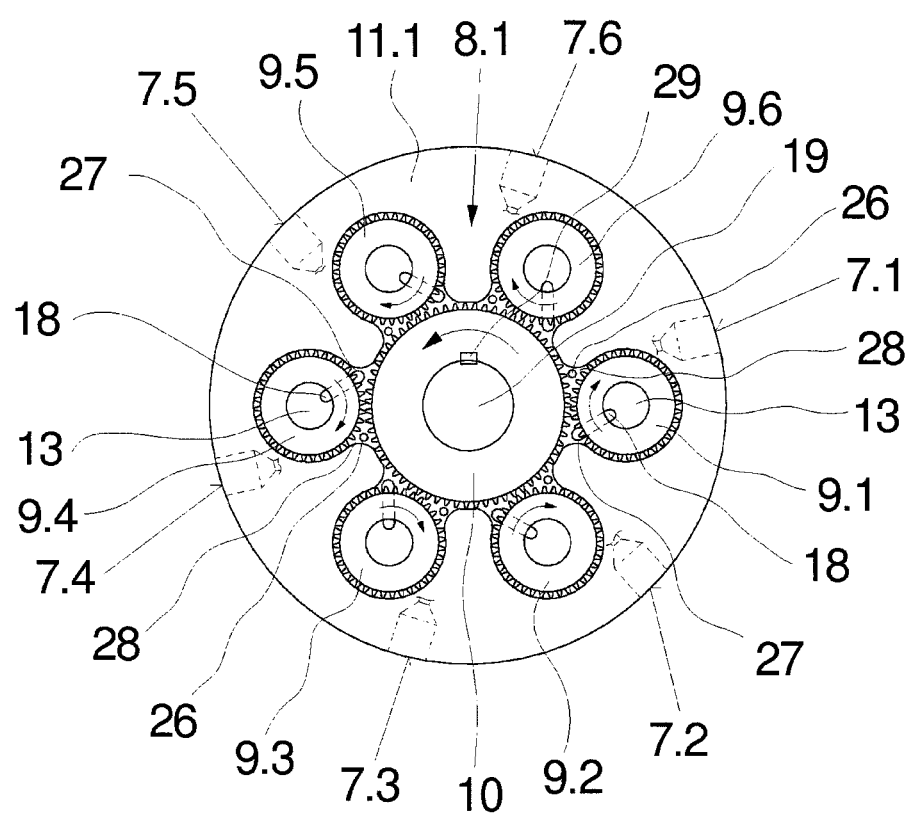

FIG. 8 schematically shows a cross-sectional view of the exemplary embodiment from FIG. 6

FIG. 1 schematically illustrates an exemplary embodiment of a device according to the invention for wetting multiple threads. The exemplary embodiment has multiple wetting means 1.1 to 1.6. The number of wetting means is an example. The number of wetting means is basically coordinated with the number of threads which, adjacent to one another in parallel, are to be wetted simultaneously as a group. Here, by way of example, as wetting means 1.1 to 1.6, a wetting body 2 is shown which has an open wetting groove 3 at one side. A dosing bore 4 opens out in the wetting groove 3. The dosing bore 4 is connected to one of the conveying lines 5.1 to 5.6.

The wetting means illustrated in FIG. 1 in the form of a wetting body 2 is an example. It is basically possible for such wetting means to be utilized for the preparation of a thread or for example for the cooling of a thread. The wetting means are designed correspondingly in accordance with the usage situation. For example, for the cooling of threads, elongate wetting grooves are used to which the fluid is fed in a run-in region.

Each of the wetting means 1.1 to 1.6 is connected via a separate conveying line 5.1 to 5.6 to a dosing pump 6. For this purpose, the dosing pump 6 has a multiplicity of conveying means, to which in each case one of several pump outlets 7.1 to 7.6 are assigned. The conveying lines 5.1 to 5.6 are connected to the pump outlets 7.1 to 7.6.

The dosing pump 6 is connected by means of a pump inlet 17 and an inflow line 30 to a fluid accumulator (not illustrated here) which holds a fluid provided for the wetting. The dosing pump 6 is driven by means of an electric motor 31, which could be designed for example as a stepper motor.

The construction of the dosing pump 6 and the construction of the conveying means will be described in more detail below with reference to FIGS. 2 to 4.

FIGS. 2 and 3 each show a longitudinal sectional view of the dosing pump 6, and FIG. 4 shows a cross section of the dosing pump 6. Where no explicit reference is made to one of the figures, the following description applies to all figures.

The dosing pump 6 is composed of multiple housing plates 12.1 to 12.4, which in this case have a circular cross section. The housing plates 12.1 to 12.4 enclose between them multiple planetary gear sets 8.1 to 8.3, which are each enclosed within a centering plate 11.1 to 11.3. The housing plates 12.1 to 12.4 and the interposed centering plates 11.1 to 11.3 are held together in pressure-tight fashion.

Each of the planetary gear sets 8.1 to 8.3 forms multiple conveying means, which will be described in more detail below on the basis of the illustration in FIG. 4.

As can be seen from the illustration in FIG. 4, one of the planetary gear sets, in this case the planetary gear set 8.1, has two outer planet gears 9.1 and 9.2 and a sun gear 10 arranged in the center. The sun gear 10 is held by means of a shaft-hub connection 29 on the circumference of a drive shaft 19. The planet gears 9.1 and 9.2 are arranged oppositely to both sides of the sun gear 10 and are in engagement with the sun gear 10. For this purpose, the planet gears 9.1 and 9.2 are guided freely in the centering plate 11.1. In the region a short distance in front of and a short distance behind the points of toothed engagement of the planet gears 9.1 and 9.2 with the sun gear 10, the centering plate 11.1 has in each case one free space, which free spaces act as run-in zone and run-out zone. If the sun gear 10 is driven counterclockwise, a first run-in zone 27.1 forms in the upper region between the planet gear 9.1 and the sun gear 10. The run-out zone 28.1 is formed on the side situated opposite the point of toothed engagement. In the technical field, the run-in zone is also referred to as section chamber and the run-out zone is referred to as pressure chamber. On the opposite side, a second run-in zone 27.2 is formed below the point of toothed engagement between the planet gear 9.2 and the sun gear 10. Opposite this, the run-out zone 28.2 is situated on the top side of the point of toothed engagement.

The planetary gear set 8.1 illustrated in FIG. 4 thus forms two conveying means which generate two separate dosing flows of the fluid. The number of planet gears 9.1 and 9.2 is an example. It would also be possible for more than two planet gears to be assigned to the sun gear 10.

As can also be seen from the illustration in FIG. 4, the run-in zones 27.1 and 27.2 are assigned in each case one distribution groove 18.1 and 18.2, which are formed on one side of the housing plate 12.2. Here, the distribution grooves 18.1 and 18.2 extend from the run-in zones 27.1 and 27.2 in each case to a passage opening 13 which is formed in the planet gears 9.1 and 9.2.

For further explanation of the filling of the run-in zones 27.1 and 27.2, reference is made below to FIG. 2.

As can be seen from the illustration in FIG. 2, all of the planet gears 9.1 and 9.2 of the planetary gear sets 8.1 to 8.3 have in each case one passage opening 13. The passage openings 13 are preferably formed in the central region of the planet gears 9.1 and 9.2. The passage openings 13 are connected by means of a channel system 14 to a pump inlet 17. In this case, the channel system 14 is formed by multiple housing bores in the housing plates 12.1, 12.2 and 12.3. For this purpose, multiple axially running distribution bores 15.1 and 15.2 are formed, which extend through the housing plates 12.2 and 12.3 and which connect the passage openings 13 of the planet gears 9.1 and 9.2 in the planetary gear sets 8.1 to 8.3 to one another.

On the outer housing plate 12.1, which is extended through by the drive shaft 19, there is formed the pump inlet 17. The pump inlet 17 is connected via an inlet channel 16.1 to an inlet chamber 20 in the interior of the housing plate 12.1. The inlet chamber 20 is formed concentrically with respect to the drive shaft 19 and is sealed off to the outside by means of a seal 21. The inlet chamber 20 is connected by means of two inlet bores 16.2 and 16.3, which are arranged obliquely as housing bores, to the passage openings 13 in the planet gears 9.1 and 9.2 of the first planetary gear set 8.1. It is thus possible for a fluid fed via the pump inlet 17 to be fed to the passage openings 13 in the planet gears of all planetary gear sets 8.1 to 8.3.

As has already been presented and described on the basis of FIG. 4, the housing plates 12.3 and 12.4 likewise have, on the side facing toward the planetary gear sets 8.2 and 8.3, multiple distribution grooves 18.1 and 18.2 in order to connect the passage openings 13 of the planet gears 9.1 and 9.2 to the run-in zones 27.1 and 27.2 of the planetary gear sets 8.2 and 8.3.

As can be seen from the illustration in FIG. 4, the run-out zones 28.1 and 28.2 of the planetary gear set 8.1 are connected by means of in each case one axial outlet bore 26.1 and 26.2 in the housing plate 12.2 to in each case one pump outlet.

As can be seen from the illustration in FIG. 3, the axial outlet bores 26.1 and 26.2 open in each case into a radial outlet bore 25.1 and 25.2 of the housing plate 12.2. The radial outlet bores 25.1 and 25.2 connect the pump outlet 7.1 and 7.2 formed on the circumference of the housing plate 12.2. In this exemplary embodiment, the pump outlets 7.1 and 7.2 have in each case one plug-in connection 24, which permits a direct attachment of a line end of the conveying line.

At this juncture, it is however expressly pointed out that the pump outlets 7.1 to 7.6 could also be designed with a thread.

The pump outlets 7.3 to 7.6 formed in the housing plates 12.3 and 12.4 are, in the same way, connected by means of in each case one radial outlet bore 25.1 and 25.2 and one axial outlet bore 26.1 and 26.2 to the outlet zones 28.1 and 28.2 of the planetary gear sets 8.2 and 8.3.

The drive shaft 19 provided for driving the planetary gear sets 8.1 and 8.3 extends through the housing plates 12.1, 12.2 and 12.3 and is mounted rotatably by means of one end of the housing plate 12.4. By means of a drive end which is not illustrated in any more detail here, the drive shaft 19 is connected to an electric motor. FIG. 5 illustrates one possible embodiment for the drive of the drive shaft 19.

FIG. 5 schematically shows a cross-sectional view of an electric motor, which in this exemplary embodiment could be a stepper motor. The electric motor 31 has a motor housing 32, which is held directly on the housing plate 12.1. The drive shaft 19 projects with a free drive end 33 into the interior of the electric motor 31. On the circumference of the drive end 33, there is arranged a rotor 34, which interacts with a stator 35. The drive shaft 19 can thus be driven directly by means of the electric motor 31.

In the case of the device according to the invention illustrated in FIG. 1 for wetting multiple threads, the dosing pump 6 is driven by the electric motor 31 at a predetermined rotational speed. Here, via the pump inlet 17 and the feed line 30, a fluid is drawn in, and fed to the respective run-in zones 27.1 and 27.2, by the planetary gear sets 8.1 to 8.3. Here, the fluid passes in each case into the passage openings 13 of the planet gears 9.1 and 9.2 and flows uniformly through the axial gaps. As a result of the rotation of the sun gears 10, the planet gears 9.1 and 9.2, which are in engagement, are driven, such that the fluid is conveyed from the run-in zone into the run-out zone. The dosed fluid flow then passes via the pump outlets 7.1 to 7.6 into the conveying lines 5.1 to 5.6 and is fed to the wetting means 1.1 to 1.6. By means of the planet gears 9.1 and 9.2, which are guided freely in the centering plates 11.1 to 11.3, of the planetary gear sets 8.1 to 8.3, very small tip clearances and thus small dead spaces are realized. Furthermore, continuous flushing of the axial gaps in the planetary gear sets 8.1 to 8.3 is ensured, such that a continuous fluid flow takes place within the pump. The device according to the invention thus permits continuous operation with substantially uniform dosed fluid flows in order to wet the threads. It is thus possible to ensure high levels of dosing accuracy over a long service life.

The device according to the invention as per the exemplary embodiment in FIG. 1 is operated with a dosing pump which has multiple planetary gear sets for forming the conveying means. Here, each of the planetary gear sets is composed of two planet gears and one sun gear. This embodiment is an example. For example, it would even be possible for one planetary gear set with multiple planet gears to be utilized for supplying a fluid to the wetting means of the device according to the invention as per FIG. 1. Such an exemplary embodiment of a dosing pump 6 is illustrated in multiple views in FIGS. 6, 7 and 8. FIGS. 6 and 7 each show a longitudinal sectional view, and FIG. 8 shows a cross-sectional view, of the dosing pump 6. Where no explicit reference is made to one of the figures, the following description applies to all figures.

The exemplary embodiment of the dosing pump 6 as per FIGS. 6 to 8 is composed of the housing plates 12.1 and 12.2, which in this example likewise have a circular cross section. It is however pointed out at this juncture that the outer contour of the housing plates 12.1 and 12.2 may have any desired design, for example also a polygonal shape. The housing plates 12.1 and 12.2 enclose between them a planetary gear set 8.1, which is enclosed within a centering plate 11.1. The housing plates 12.1 and 12.2 and the interposed centering plate 11.1 are held together in pressure-tight fashion.

As can be seen from the illustration in FIG. 8, the planetary gear set 8.1 in this exemplary embodiment has six outer planet gears 9.1 to 9.6 and a sun gear 10 arranged in the center. The sun gear 10 is held by means of a shaft-hub connection 29 on the circumference of a drive shaft 19. The planet gears 9.1 to 9.6 are arranged so as to be distributed uniformly over the circumference of the sun gear 10 and are in engagement with the sun gear 10. For this purpose, the planet gears 9.1 to 9.6 are guided freely in the centering plate 11.1. The planetary gear set 8.1 thus forms a total of six conveying means for generating, at the pump outlet 7.1 to 7.6, six separate dosing flows of a fluid for wetting threads. This exemplary embodiment of the dosing pump could thus be utilized directly in the embodiment of the device according to the invention illustrated in FIG. 1 in order to provide a supply to the total of six wetting means. Here, the functioning of the gear sets of the planetary gear set 8.1 is identical to the exemplary embodiment in FIG. 4, such that, at this juncture, reference is made to the description above. Each of the toothed gear pairings between the planet gears 9.1 to 9.6 and the sun gear 10 is thus assigned a run-in zone 27 and a run-out zone 28. The run-in zones 27 assigned to the planet gears 9.1 to 9.6 are connected in each case by means of a distribution groove 18 to a passage opening 13 in one of the planet gears 9.1 to 9.6.

Each of the planet gears 9.1 to 9.6 thus has a separate passage opening 13, which passage openings are jointly connected by means of a channel system 14 to a pump inlet 17, as can be seen from the illustration in FIG. 6. In this case, the channel system 14 is formed by multiple housing bores, which extend as inlet bores 16.2 to 16.7 through the housing plate 12.1 from a central inlet chamber 20 to the side wall facing toward the planetary gear set 8.1. The inlet bores 16.2 to 16.7 open in each case into one of the passage openings 13 in the planet gears 9.1 to 9.6. The pump inlet 17 is connected via an inlet channel 16.1 to the inlet chamber 20. In this exemplary embodiment, the pump inlet 17 is formed with a plug-in connection 24, such that a direct attachment of a line end of the inflow line is possible.

On the outer housing plate 12.1, which is extended through by the drive shaft 19, there is formed the pump inlet 17. The drive shaft 19 and the inlet chamber 20 is, in the housing plate 12.1, sealed off to the outside by means of a seal 21.

As can already be seen from the illustration in FIG. 8, the run-out zones 28 of the planetary gear set 8.1 are connected by means of in each case one axial outlet bore 26 in the housing plate 12.2 to one of the pump outlets 7.1 to 7.6.

As can be seen from the illustration in FIG. 7, the axial outlet bores 26 open in each case into a radial outlet bore 25 of the housing plate 12.2. The radial outlet bores 25 connect the pump outlets 7 formed on the circumference of the housing plate 12.2 to the respective run-out zones of the respective toothed gear pair. This exemplary embodiment thus has a total of six pump outlets, wherein only the pump outlets 7.1 and 7.4 are illustrated in FIG. 7. In this exemplary embodiment, the pump outlets 7.1 and 7.4 likewise have in each case one plug-in connection 24, which permits a direct attachment of a line end of the conveying line.

As can be seen from the illustrations in FIGS. 6 and 7, the drive shaft 19 is mounted with one end in the housing plate 12.2. With an opposite end not illustrated here, the drive shaft 19 is coupled to a drive. The connection between the sun gear 10 of the planetary gear set 8.1 and the drive shaft 19 is, in this exemplary embodiment, formed by a shaft-hub connection 29.

During operation, it is thus possible for six conveying means to be formed, which generate six uniformly dosed fluid flows and discharge these via the pump outlets 7.1 to 7.6. In this respect, the exemplary embodiment of the dosing pump with only one planetary gear set 8.1 is also suitable for implementing the device illustrated in FIG. 1.

At this juncture, it is pointed out that the designs of the housing bores in the illustrated exemplary embodiments of the dosing pump according to the invention are examples. It is essential here that the pump inlet is connected to the passage openings in the planet gears. Here, it is also possible for multiple pump inlets to be used in order to change the structural design of the channel system. To achieve as far as possible disruption-free wetting without outgassing, the feed of the fluid by means of the planet gears is particularly advantageous. Uniform flushing around the planet gears is thus realized, said planet gears being integrated into the planetary gear set with minimal dead volume.

The invention claimed is:

1. A device for wetting multiple threads with a fluid, the device comprising:
   multiple wetting means assigned to the threads; and
   a dosing pump which is connected to the wetting means by multiple conveying lines, wherein the dosing pump has multiple conveying means for generating multiple dosing flows of the fluid and has multiple pump outlets, to which the conveying lines are connected, wherein the conveying means are formed by at least one planetary gear set arranged between housing plates, wherein multiple planet gears of the planetary gear set are guided freely by a centering plate between adjacent housing plates, wherein the planet gears of the planetary gear set have in each case one passage opening, and wherein the passage openings of the planet gears are connected by a channel system to at least one pump inlet.

2. The device as claimed in claim 1, wherein the channel system has multiple housing bores in the housing plates, which housing bores open into the passage openings of the planet gears of the planetary gear set.

3. The device as claimed in claim 2, wherein multiple planetary gear sets are held between the housing plates, and in that the housing bores have multiple inlet bores in one of the housing plates and multiple axial distribution bores in the housing plates arranged between adjacent planetary gear sets.

4. The device as claimed in claim 3, wherein the housing plates have, on a side facing toward the planetary gear set, multiple distribution grooves which extend in each case between one of the passage openings and one of several run-in zones of the planetary gear sets.

5. The device as claimed in claim 1 wherein the planetary gear sets are connected to a drive shaft, and in that the drive shaft is coupled to a stepper motor.

6. The device as claimed in claim 5, wherein the stepper motor is held with a housing on an outer housing plate, and in that the drive shaft is connected directly to a rotor of the stepper motor.

7. The device as claimed in claim 6, wherein the pump outlets, which are assigned to one of the planetary gear sets, in one of the housing plates are formed in each case as a plug-in connector.

8. A dosing pump for use in a device for wetting threads, the dosing pump comprising:
   multiple conveying means which are assigned separate pump outlets, wherein the conveying means are formed by at least one planetary gear set arranged between housing plates, wherein multiple planet gears of the planetary gear set are guided by a centering plate between adjacent housing plates, wherein the planet gears of the planetary gear set have in each case one passage opening, and wherein the passage openings of the planet gears are connected by a channel system to at least one pump inlet.

9. The dosing pump as claimed in claim 8, wherein the channel system has multiple housing bores in the housing plates, which housing bores open into the passage openings of the planet gears of the planetary gear set.

10. The dosing pump as claimed in claim 9, wherein multiple planetary gear sets are held between the housing plates, and in that the housing bores have multiple inlet bores in one of the housing plates and multiple axial distribution bores in the housing plates arranged between adjacent planetary gear sets.

11. The dosing pump as claimed in claim 10, wherein the housing plates have, on a side facing toward the planetary gear set, multiple distribution grooves which extend in each case between one of the passage openings and one of several run-in zones of the planetary gear sets.

12. The dosing pump as claimed in claim 8 wherein the planetary gear sets are connected to a drive shaft, and in that the drive shaft is coupled to a stepper motor.

13. The dosing pump as claimed in claim 12, wherein the stepper motor is held with a housing on an outer housing plate, and in that the drive shaft is connected directly to a rotor of the stepper motor.

14. The dosing pump as claimed in claim 13, wherein the pump outlets, which are assigned to one of the planetary gear sets, in one of the housing plates are formed in each case as a plug-in connector.

* * * * *